G. H. LANGTON.

ADJUSTABLE LOCOMOTIVE DRIVING BOX BRASS.

APPLICATION FILED AUG. 31, 1916.

Reissued Mar. 20, 1917. 14,275.

WITNESS

Wm. Geiger

INVENTOR.

George H. Langton

BY George T. Laight

ATTORNEY

UNITED STATES PATENT OFFICE.

GEORGE HENRY LANGTON, OF PORTSMOUTH, VIRGINIA, ASSIGNOR OF ONE-HALF TO J. W. SMALL, OF PORTSMOUTH, VIRGINIA.

ADJUSTABLE LOCOMOTIVE DRIVING-BOX BRASS.

14,275. Specification of Reissued Letters Patent. Reissued Mar. 20, 1917.

Original No. 1,150,375, dated August 17, 1915, Serial No. 874,561, filed November 28, 1914. Application for reissue filed August 31, 1916. Serial No. 117,962.

*To all whom it may concern:*

Be it known that I, GEORGE H. LANGTON, a citizen of the United States, and formerly a resident of Raleigh, in the county of Wake and State of North Carolina, but now residing at Portsmouth, county of Norfolk, and State of Virginia, have invented certain new and useful Improvements in Adjustable Locomotive Driving-Box Brasses, of which the following is a specification, and which are illustrated in the accompanying drawings, forming a part thereof.

This invention relates to adjustable locomotive driving box brasses.

The ordinary driving box brass is forced into place in its seat in the box under pressure, but is liable to become loose in the driving box in time because of its expansion and contraction or from other causes, and becomes loose in its fit on the journal due to wear and other causes. When this occurs it is necessary to remove the brass and apply a new one, and this necessitates placing the locomotive in the repair shop for several days or for an even longer period of time, and in the ordinary construction of driving box and brass, a satisfactory job cannot be done in the application of a new brass without removing the wheels and otherwise dismembering the locomotive.

It is therefore the aim of the present invention to provide a driving box brass that may be applied, removed and adjusted without the necessity of removing the wheels or otherwise dismantling the locomotive, or placing the locomotive in the repair shop for any considerable length of time.

A further aim is to provide a driving box brass so constructed that it may be expanded to provide the necessary pressure under which a driving box brass has to be forced into place in its seat in the box, without removing the wheels or otherwise dismantling the locomotive.

Another aim is to provide a driving box brass that may be applied, removed or adjusted without the employment of heavy machinery, hydraulic or screw presses or like devices, and at a minimum of time, labor and expense.

Figure 1:
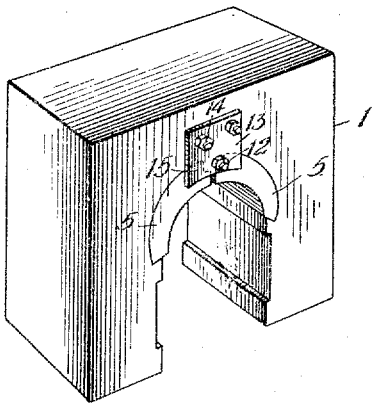
Figure 5:
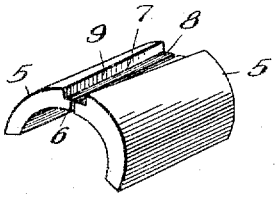
Figure 4:
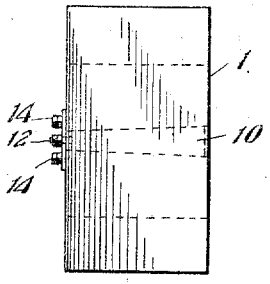
Figure 6:
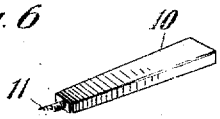
Figure 2:
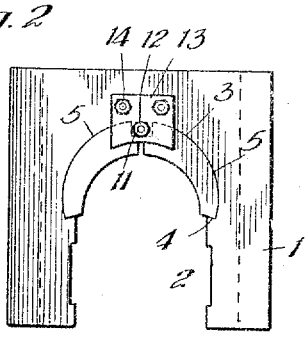
Figure 3:
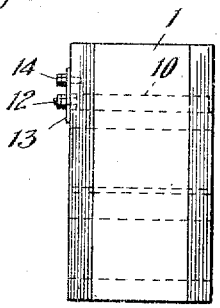

In the accompanying drawings, Figure 1 is a perspective view of a driving box equipped with the brass embodying the present invention. Fig. 2 is a side elevation of the device. Fig. 3 is an end elevation thereof. Fig. 4 is a top plan view. Fig. 5 is a perspective view of the brass removed from the box. Fig. 6 is a perspective view of the expanding wedge for the brass.

Corresponding and like parts are referred to in the following description and indicated in all the views of the accompanying drawings by the same reference characters.

In the drawings, the numeral 1 indicates in general an ordinary locomotive driving box which is provided with the usual recess 2 for the reception of the driving axle. The box is further provided in the top wall of the recess 2 with the usual arcuate seat 3 to receive the brass, this seat terminating at shoulders 4 located at opposite sides of the recess 2 and arranged for the engagement and support of the lateral edges of the brass. The ordinary driving box brass is cast in one piece and is, as before stated, forced into its seat in the driving box under high pressure. The brass embodying the present invention, however, is formed in two sections, each indicated by the numeral 5. When these sections 5 are assembled, the resulting brass is substantially of the same form as the ordinary one piece brass, or, in other words, is of arcuate form and by reference to the drawings it will be observed that the sections 5 comprising the brass constitute halves of the brass as a whole, so that the brass is, in fact, divided medially of its top or crown, as indicated at 6. The sections 5 at their meeting edges are each formed in its upper side with a recess 7, each recess having a plane bottom wall 8 and an angularly disposed vertical wall 9. Stated in other words, the vertical walls of the recesses in the brass sections are non-parallel to the meeting edges of the sections. Thus, when the sections are assembled as shown in Fig. 5, a tapered channel or groove is provided in the upper surface of the crown of the brass, the side walls of the groove or channel diverging in the direction of one end of the brass. In Fig. 6 there is illustrated a wedge 10, which is disposed within the channel or groove in the upper surface of the brass and which is provided for the purpose of relatively separating the sections 5 so as to expand the brass as a whole and cause the same to fit snugly and tightly in its seat in the driving box 1. The wedge 10 is provided at its minor end with a threaded stem or tang 11 to which is applied a nut 12 designed to be tightened in a manner now to be explained in order to draw the wedge in the direction of the minor end of the groove in the brass for the purpose stated.

The numeral 13 indicates a plate which is bolted or otherwise secured, as at 14 to one face of the driving box 1 and which has an arcuate lower edge portion 15 which projects below the upper surface of the seat 3 in the said driving box, and which constitutes an abutment for the ends of the brass sections 5 and a bearing for the nut 12, the stem 11 of the wedge being fitted through an opening in the said plate, as will be apparent from an inspection of the drawings. It will now be understood that when the brass sections have been assembled within the seat 3, in doing which it is desirable that a spreader be arranged within the recess 2 for the purpose of slightly expanding the driving box and then allowing the box to resume its normal condition to firmly bind the brass sections, the nut 12 may be tightened for the purpose of adjusting the wedge 10 lengthwise in the groove of the brass for the purpose of expanding the brass sections to cause them to more firmly seat within the seat in the driving box. It will of course be understood that the nut 12 may be tightened from time to time, as occasion may require, for the purpose of compensating for the contraction of the brass sections and for wear.

As will be apparent from an inspection of the drawing, the wedge 10 is permitted lateral movement to thereby insure equalizing the lateral pressure on the driving brass sections 5—5. In this way, should there be any slight differences in the dimensions of the brasses 5—5 or the recesses 7—7, the wedge 10 will compensate therefor. In order that the wedge 10 may not project beyond the inner and outer faces of the box 2 or the brass therein, it is made somewhat shorter than the distance from inner to outer face of the brass as appears from dotted lines in Figs. 3 and 4. It will also be noted that, with my arrangement, it is unnecessary to taper the wedge vertically, considering the wedge in operative position. In other words, the wedge 10 is of uniform depth or thickness as is also the channel formed by the recesses 7. As clearly appears from the drawing, the plate 13 naturally overhangs the smaller end of the tapered channel formed by the opposed recesses 7—7 in the brass sections so that the wedge 10 can be drawn in the direction of its smaller end. It is obvious that the tapered seat or channel formed by the recesses 7—7 is closed on its upper portion by the adjacent wall of the seat for the brasses, formed in the driving box.

While the invention is primarily intended for application to locomotive driving box brasses, it may be, as will be readily understood, used for other purposes where a similar brass is to be employed. It will furthermore be understood that slight modifications may be made in the construction if found necessary or desirable.

Having thus described the invention, what is claimed as new is:

1. A driving box having a seat and opposed shoulders at the sides of the seat, a sectional driving brass fitted within the seat and upon the said shoulders and having portions removed from adjacent edges to form a longitudinally tapered channel, a longitudinally tapered wedge fitted in the tapered channel and disposed wholly within the inner and outer faces of the driving brass to move freely longitudinally and laterally with reference to the seat to equalize the lateral pressure on the driving brass sections, and means for moving the wedge longitudinally and holding the same in the adjusted position.

2. A driving box having a seat and opposed shoulders at the sides of the seat, a sectional driving brass fitted within the seat and upon the said shoulders and having longitudinal portions removed from the outer adjacent corners to form a longitudinally tapered channel of uniform depth adjacent the seat, a wedge of uniform thickness and tapering in width throughout its length and disposed in said longitudinally tapered channel to move freely on the seat laterally and longitudinally to equalize the lateral pressure on the driving brass sections, and means coacting with the wedge and box to draw the wedge into the channel to press the driving box sections apart and hold said wedge in the adjusted position.

3. A driving box having a seat and opposed shoulders at the sides of the seat, a sectional driving brass fitted within the seat and upon the said shoulders and having longitudinal corner portions of adjacent sections next the seat removed to form a longitudinally tapered channel which is closed by the seat, a plate secured to a side of the driving box and projecting beyond the seat to overhang the smaller end of the tapered channel and the ends of the driving brass sections, said plate having an opening in line with the tapered channel, a wedge inserted in the tapered channel and freely movable laterally and longitudinally on the seat to equalize the lateral pressure on the driving brass sections, said wedge having a threaded stem at its smaller end to pass through the opening of the plate, and a nut mounted upon the projecting portion of the threaded stem and engaging the plate to draw the wedge into the tapered channel to press the driving brass sections apart and hold them firmly against the seat and upon the said shoulders.

4. In a device of the character described, the combination with a box having a seat; of a sectional brass fitting against said seat, the meeting edges of the sections being recessed longitudinally thereof to thereby form a channel tapered in the direction of the length of said sections; a wedge fitting within said channel and adapted to be moved longitudinally and laterally therein to thereby effect an equalized separating pressure on the brass sections; and means for adjusting the position of said wedge and to retain it in adjusted position.

In testimony whereof I affix my signature in presence of two witnesses.

GEORGE HENRY LANGTON.

Witnesses:
J. W. Small,
H. W. Isbell.